US012757218B2

(12) United States Patent
Wang et al.

(10) Patent No.: US 12,757,218 B2
(45) Date of Patent: Oct. 6, 2026

(54) INFORMATION DETERMINATION METHOD AND APPARATUS, AND STORAGE MEDIUM

(71) Applicant: DATANG MOBILE COMMUNICATIONS EQUIPMENT CO., LTD., Beijing (CN)

(72) Inventors: Lei Wang, Beijing (CN); Yanping Xing, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 383 days.

(21) Appl. No.: 18/261,274

(22) PCT Filed: Dec. 17, 2021

(86) PCT No.: PCT/CN2021/139105

§ 371 (c)(1),
(2) Date: Jul. 13, 2023

(87) PCT Pub. No.: WO2022/156448

PCT Pub. Date: Jul. 28, 2022

(65) Prior Publication Data

US 2024/0064767 A1 Feb. 22, 2024

(30) Foreign Application Priority Data

Jan. 19, 2021 (CN) ......................... 202110070533.7

(51) Int. Cl.

*H04W 72/232* (2023.01)
*H04B 1/713* (2011.01)
*H04L 5/00* (2006.01)

(52) U.S. Cl.

CPC .......... *H04W 72/232* (2023.01); *H04B 1/713* (2013.01); *H04L 5/0005* (2013.01)

(58) Field of Classification Search

CPC .... H04W 72/232; H04B 1/713; H04L 5/0005; H04L 1/1819; H04L 1/189; H04L 5/0012;
(Continued)

(56) References Cited

U.S. PATENT DOCUMENTS

2020/0351931 A1* 11/2020 Babaei ................ H04W 52/365
2021/0195653 A1* 6/2021 Lei ........................ H04L 5/0094
(Continued)

FOREIGN PATENT DOCUMENTS

CN 110475374 A 11/2019
WO 2016131344 A1 8/2016
(Continued)

OTHER PUBLICATIONS

Vivo, "Discussion on Type A PUSCH repetition for Msg3", 3GPP TSG RAN WG1 #104-e, e-Meeting, Jan. 25-Feb. 5, 2021, total 7 pages, R1-2100461.
(Continued)

*Primary Examiner* — Tejis Daya
(74) *Attorney, Agent, or Firm* — KILPATRICK TOWNSEND & STOCKTON LLP

(57) ABSTRACT

Embodiments of the present disclosure provide an information determination method and apparatus, and a storage medium, the method including on the basis of network side device indication information or a predefined rule, determining a frequency hopping mode used in a Msg3 physical uplink shared channel (PUSCH) transmission and/or a redundancy version (RV) used in Msg3 PUSCH repetition, and a terminal has enabled the Msg3 PUSCH repetition and the frequency domain frequency hopping function. The embodiments of the present disclosure solve the problem in the prior art in which the means of transmission can limit the transmission performance of a Msg3 PUSCH.

12 Claims, 2 Drawing Sheets

(58) Field of Classification Search
CPC ... H04L 5/0028; H04L 5/0044; H04L 5/0082; H04L 5/0092; H04L 5/0053; H04L 5/0058
See application file for complete search history.

(56) References Cited

U.S. PATENT DOCUMENTS

| | | | | |
|---|---|---|---|---|
| 2021/0251016 | A1* | 8/2021 | Xiong | H04L 1/0061 |
| 2021/0360660 | A1* | 11/2021 | Cozzo | H04W 72/535 |
| 2022/0015149 | A1* | 1/2022 | Ly | H04W 74/006 |
| 2023/0247680 | A1* | 8/2023 | Seok | H04L 5/0012 |
| 2023/0261694 | A1* | 8/2023 | Guo | H04L 5/0007 370/329 |
| 2023/0262753 | A1* | 8/2023 | Axnäs | H04W 74/002 370/329 |
| 2024/0008093 | A1* | 1/2024 | Ly | H04W 74/0833 |

FOREIGN PATENT DOCUMENTS

| | | | |
|---|---|---|---|
| WO | 2019216818 | A1 | 11/2019 |
| WO | 2020091571 | A1 | 5/2020 |
| WO | 2022151388 | A1 | 7/2022 |

OTHER PUBLICATIONS

European Patent Office, the partial supplementary European search report Issued in Application No. 21920822.0, Jun. 24, 2024 Germany, 16 pages.

* cited by examiner

INFORMATION DETERMINATION METHOD AND APPARATUS, AND STORAGE MEDIUM

CROSS-REFERENCE TO RELATED APPLICATION

The present application is a National Stage of International Application No. PCT/CN2021/139105, filed on Dec. 17, 2021, which claims priority to Chinese patent application No. 2021100705337 filed on Jan. 19, 2021, entitled "Information Determination Method and Apparatus, and Storage Medium", which is hereby incorporated by reference in its entirety.

FIELD

The present application relates to the field of communication, and in particular to information determination methods and apparatuses, and a storage medium.

BACKGROUND

In a 5th generation new radio access technology (5th Generation New RAT, NR) mobile communication system, the coverage range of a cell is an indicator that operators pay close attention to. However, the transmission of physical uplink shared channel (PUSCH) carrying message 3 (Msg3) is a bottleneck for coverage in the 5G NR system. How to enhance the coverage range for PUSCH carrying Msg3, i.e. Msg3 PUSCH, is an important issue at present. 3rd generation partnership project (3GPP) decided to introduce a retransmission mechanism of repetition type A for Msg3 PUSCH. However, there are no clear solutions on how to determine the frequency hopping mode for Msg3 PUSCH repetition and how to determine the redundancy version (RV) for Msg3 PUSCH repetition.

SUMMARY

Embodiments of the present application provide information determination methods and apparatuses, and a storage medium, which solve the problem that the transmission performance of message 3 (Msg3) PUSCH cannot be ensured in traditional repetition methods.

An embodiment of the present application provides an information determination method, including:

determining, based on indication information from a network side device or a predefined rule, a frequency hopping mode for message 3 (Msg3) physical uplink shared channel (PUSCH) and/or a redundancy version (RV) for Msg3 PUSCH repetition; where the terminal has enabled the Msg3 PUSCH repetition and frequency hopping in frequency domain.

An embodiment of the present application provides an information determination method, including:

determining based on a predefined rule, or indicating to a terminal a frequency hopping mode for message 3 (Msg3) physical uplink shared channel (PUSCH) and/or a redundancy version (RV) for Msg3 PUSCH repetition; where the terminal has enabled the Msg3 PUSCH repetition and frequency hopping in frequency domain.

An embodiment of the present application provides a terminal, including a memory, a transceiver, and a processor:

the memory is used for storing computer programs; the transceiver is used for transmitting and receiving data under a control of the processor; and the processor is used for reading the computer programs in the memory, where the computer programs, when executed by the processor, causes the terminal to perform the following operations:

determining, based on indication information from a network side device or a predefined rule, a frequency hopping mode for message 3 (Msg3) physical uplink shared channel (PUSCH) and/or a redundancy version (RV) for Msg3 PUSCH repetition; where the terminal has enabled the Msg3 PUSCH repetition and frequency hopping in frequency domain.

An embodiment of the present application provides a network side device, including a memory, a transceiver, and a processor:

the memory is used for storing computer programs; the transceiver is used for transmitting and receiving data under a control of the processor; and the processor is used for reading the computer programs in the memory, where the computer programs, when executed by the processor, causes the network side device to perform the following operations:

determining based on a predefined rule, or indicating to a terminal a frequency hopping mode for message 3 (Msg3) physical uplink shared channel (PUSCH) and/or a redundancy version (RV) for Msg3 PUSCH repetition; where the terminal has enabled the Msg3 PUSCH repetition and frequency hopping in frequency domain.

An embodiment of the present application provides an information determination apparatus, including:

a determination device for determining, based on indication information from a network side device or a predefined rule, a frequency hopping mode for message 3 (Msg3) physical uplink shared channel (PUSCH) and/or a redundancy version (RV) for Msg3 PUSCH repetition; where the terminal has enabled the Msg3 PUSCH repetition and frequency hopping in frequency domain.

An embodiment of the present application provides an information determination apparatus, including:

an indication device for determining based on a predefined rule, or indicating to a terminal a frequency hopping mode for message 3 (Msg3) physical uplink shared channel (PUSCH) and/or a redundancy version (RV) for Msg3 PUSCH repetition; where the terminal has enabled the Msg3 PUSCH repetition and frequency hopping in frequency domain.

An embodiment of the present application provides a processor readable storage medium storing a computer program, and the computer program, when executed by a processor, causes the processor to perform any one of the methods described above.

In the information determination methods and apparatuses, and the storage medium provided in the present application, for the case in which the Msg3 PUSCH repetition and the frequency hopping in the frequency domain are enabled, the frequency hopping mode for Msg3 PUSCH and/or the RV for Msg3 PUSCH repetition are determined based on the indication information from the network side device or the predefined rule, which increases selection ranges for the frequency hopping mode and/or the RV. The transmission performance of the uplink channel may be effectively improved, a problem that the traditional transmission manner limits the transmission performance of the Msg3 PUSCH is solved, and the coverage range is increased.

BRIEF DESCRIPTION OF THE DRAWINGS

In order to clearly illustrate the solutions in the embodiments of the present application or the related art, the accompanying drawings to be used in the descriptions of the embodiments or the related art are briefly described below. It should be noted that the accompanying drawings in the following description are some embodiments of the present application.

DETAILED DESCRIPTION

Figure 1:
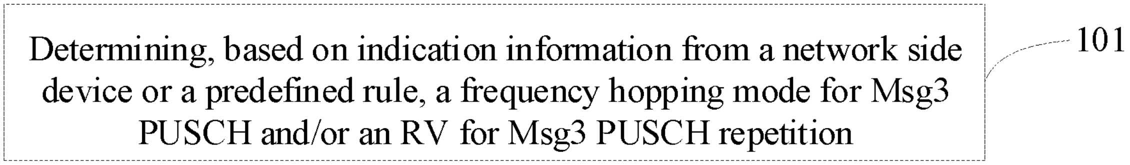
FIG. 1 is a schematic flowchart showing steps of an information determination method applied to a terminal according to an embodiment of the present application.

The solutions in the embodiments of the present application will be clearly described below in conjunction with the accompanying drawings in the embodiments of the present application. The described embodiments are only a part of the embodiments of the present application, and not all of them.

The message 3 (Msg3) physical uplink shared channel (PUSCH) initial transmission is scheduled through an uplink (UL) grant carried in a random access response (RAR), and the indication information contained in the UL grant is shown in the following table.

| RAR grant field | Number of bits |
|---|---|
| Frequency hopping flag | 1 |
| PUSCH frequency resource allocation | 14, for operation without shared spectrum channel access<br>12, for operation with shared spectrum channel access |
| PUSCH time resource allocation | 4 |
| MCS | 4 |
| TPC command for PUSCH | 3 |
| CSI request | 1 |
| ChannelAccess-CPext | 0, for operation without shared spectrum channel access<br>2, for operation with shared spectrum channel access |

The frequency hopping flag is used to indicate whether intra-slot frequency hopping is enabled in the Msg3 PUSCH initial transmission, and the channel state information request (CSI request) field is in a reserved state.

In addition, as the Msg3 PUSCH repetition is not supported at present, only intra-slot frequency hopping is supported. In addition, Msg3 PUSCH only supports RV0.

For the Msg3 PUSCH retransmission, it is scheduled by downlink control information (DCI) in format 0_0 scrambled by the temporary cell radio network temporary identifier (TC-RNTI). Since the retransmission also does not support repetition, only intra-slot frequency hopping is supported. For the RV indication field, it is reserved, which means that only RV #0 is supported for retransmission.

In case that Msg3 PUSCH repetition is supported, that is, the repetition may be performed over multiple slots, if an inter-slot frequency hopping is still not supported, the transmission performance of Msg3 PUSCH is affected. Moreover, since the Msg3 PUSCH repetition needs to be performed over multiple slots, in case that only RV #0 is used, no additional coding gain is obtained, which also limits the transmission performance of Msg3 PUSCH.

Embodiments of the present application provide information determination methods and apparatuses, and a storage medium, which solve the problem that the transmission performance of Msg3 PUSCH is limited by the traditional transmission methods in case that Msg3 PUSCH repetition is supported.

The methods and the apparatuses are based on the same conception. Since the principles of the methods and the apparatuses to solve the problems are similar, the implementation of the apparatuses and methods may be referred to each other, and the similar part is not repeated.

The solutions according to the embodiments of the present application may be applicable to various systems, for example, 5G systems. For example, the applicable systems may be a global system of mobile communication (GSM) system, a code division multiple access (CDMA) system, a wideband code division multiple access (WCDMA) general packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system (UMTS), a worldwide interoperability for microwave access (WiMAX) system, a 5G new radio (NR) system, etc. These various systems include a terminal device and a network device, and may further include a core network part, such as an evolved packet system (EPS), a 5G system (5GS), and the like.

The terminal device in the embodiments of the present application may be a device that provides voice and/or data connectivity to a user, a handheld device with a wireless connection function, or other processing devices connected to a wireless modem. In different systems, the names of the terminal may be different. For example, in the 5G system, the terminal may be called as a user equipment (UE). A wireless terminal device may communicate with one or more core networks (CNs) via a radio access network (RAN), and the wireless terminal may be a mobile terminal device, such as a mobile phone (or cellular phone) and a computer with mobile terminal device, e.g., a portable mobile device, a pocket-sized mobile device, a handheld mobile device, a computer-built mobile device or a vehicle-mounted mobile device, which exchange language and/or data with the radio access network. For example, a personal communication service (PCS) phone, a radio phone, a session initiated protocol (SIP) phone, a wireless local loop (WLL) station, a personal digital assistant (PDA) and other devices. A wireless terminal device may also be called a system, a subscriber unit, a subscriber station, a mobile station, a mobile platform, a remote station, an access point, a remote terminal, an access terminal, a user terminal, a user agent, or a user device, which is not limited in the embodiments of the present application. Since the terminal device and other network devices (such as a core network device, an access network device (i.e. a network side device)) together form a network being able to support communication, the terminal device may be regarded as a network device in the present application.

The network device in the embodiments of the present application may be a base station, and the base station may include multiple cells providing services for the terminal. Depending on the specific scenario, the base station may be called an access point, or a device communicating with a wireless terminal device through one or more sectors on the air interface in the access network, or other names. The network device may be used for exchanging received air frames with internet protocol (IP) packets, and acting as a router between the wireless terminal device and the rest of the access network, where the rest of the access network may include an IP communication network. The network device may also coordinate attribute management for the air interface. For example, the network device in the embodiments of the present application may be a base transceiver station (BTS) in a global system for mobile communications (GSM) or a code division multiple access (CDMA), or may be a node B in a wide-band code division multiple access (WCDMA), or may be an evolutional node B (eNB or e-Node B) in a long term evolution (LTE) system, or may be a 5G gNB in 5G network architecture (next generation system), or may be a home evolved node B (HeNB), a relay node, a femto, or a pico, etc., which is not limited in the embodiments of the present application. In some network structures, the network device may include a centralized unit (CU) node and a distributed unit (DU) node, and the centralized unit and the distributed unit may be geographically separated.

In addition, it should be understood that the term "and/or" in the embodiments of the present application describes the association relationship of the associated objects, indicating that three types of relationships may exist, for example, A and/or B, which may indicate the following three cases: A alone, both A and B, and B alone. The character "/" generally indicates that the associated objects before and after is an "or" relationship.

The term "multiple" in embodiments of the present application refers to two or more, and other quantifiers are similar.

The reference to "an embodiment" or "one embodiment" throughout the specification means that specific features, structures, or characteristics related to the embodiment are included in at least one embodiment of the present application. Therefore, the words "in an embodiment" or "in one embodiment" appearing throughout the entire specification may not necessarily refer to the same embodiment. In addition, these specific features, structures, or characteristics may be combined in one or more embodiments in any suitable manner.

The following is a specific description of the present application.

FIG. 1 is a schematic flowchart showing steps of an information determination method applied to a terminal according to an embodiment of the present application. As shown in FIG. 1, the information determination method includes the following steps:

step 101: determining, based on indication information from a network side device or a predefined rule, a frequency hopping mode for message 3 (Msg3) physical uplink shared channel (PUSCH) and/or a redundancy version (RV) for Msg3 PUSCH repetition;

where the terminal has enabled the Msg3 PUSCH repetition and frequency hopping in frequency domain.

In an embodiment, Msg3 PUSCH is a PUSCH carrying Msg3, and Msg3 is a third signaling among four signalings Msg1 to Msg4 in a random access procedure.

In this embodiment, in case that the terminal has enabled the Msg3 PUSCH repetition and the frequency hopping in the frequency domain, the terminal determines, based on the indication information from the network side device, the frequency hopping mode for Msg3 PUSCH and/or the RV for Msg3 PUSCH repetition, or the terminal determines, based on the predefined rule, the frequency hopping mode for Msg3 PUSCH and/or the RV for Msg3 PUSCH repetition, which increases selection ranges for the frequency hopping mode and/or the RV. As such, the transmission performance of the uplink channel may be effectively improved, a problem that the traditional transmission method limits the transmission performance of the Msg3 PUSCH is solved, and the coverage range is increased.

In an embodiment, the frequency hopping mode for Msg3 PUSCH may be determined separately with respect to Msg3 PUSCH initial transmission and Msg3 PUSCH retransmission.

For the Msg3 PUSCH initial transmission, any one of the following schemes may be used for determining, based on the indication information from the network side device or the predefined rule, the frequency hopping mode for Msg3 PUSCH.

Scheme 1: determining the frequency hopping mode based on an uplink (UL) grant carried by a random access response (RAR).

In an embodiment, a reserved bit in the UL grant carried by the RAR is used for indicating the frequency hopping mode. The frequency hopping mode includes intra-slot frequency hopping or inter-slot frequency hopping.

In an embodiment, the terminal receives the RAR transmitted from the network side device, and in case that a frequency hopping flag (FH flag) in the UL grant carried by the RAR is 1, i.e., the FH flag indicates that the frequency hopping in the frequency domain is enabled, the frequency hopping mode may be determined to be intra-slot frequency hopping or inter-slot frequency hopping based on the reserved bit in the UL grant.

For example, in case that the reserved bit in the UL grant is 0, it indicates that the frequency hopping mode is intra-slot frequency hopping; and in case that the reserved bit in the UL grant is 1, it indicates that the frequency hopping mode is inter-slot frequency hopping; or the reserved bit 0 may indicate that the frequency hopping mode is inter-slot frequency hopping, and the reserved bit 1 may indicate that the frequency hopping mode is intra-slot frequency hopping, which are not limited in the present application.

In addition, it should be noted that the inter-slot frequency hopping only takes effect in case that Msg3 PUSCH repetition is enabled.

Scheme 2: determining the frequency hopping mode based on whether repetition type A for the Msg3 PUSCH repetition is enabled.

In an embodiment, the repetition types for PUSCH repetition include two types: Type A and Type B.

In the scheme 2, in case that the FH flag in the UL grant carried in the RAR is 1, the frequency hopping mode may be determined based on whether repetition type A for the Msg3 PUSCH repetition is enabled.

In an embodiment, in case that the Msg3 PUSCH is transmitted over a single slot, the frequency hopping mode is determined as intra-slot frequency hopping; or in case that the Msg3 PUSCH is transmitted over multiple slots, the frequency hopping mode is determined as inter-slot frequency hopping.

Scheme 3: determining, based on a random access channel (RACH) configuration index, the frequency hopping mode for a case in which repetition type A for the Msg3 PUSCH repetition is enabled.

In an embodiment, there is a given correspondence relationship between the RACH configuration index and the frequency hopping mode. The frequency hopping mode includes intra-slot frequency hopping or inter-slot frequency hopping.

In an embodiment, the terminal may determine, based on the RACH configuration index, the frequency hopping mode for the case in which repetition type A for the Msg3 PUSCH repetition is enabled and the FH flag is 1.

For example, in case that the frequency hopping is enabled and repetition type A for the Msg3 PUSCH repetition is enabled, the network side device may implicitly indicate the frequency hopping mode for the Msg3 PUSCH through different RACH configuration indexes. At this time, an additional resource for RACH transmission may be configured on the basis of the RACH configuration configured by system information block type1 (SIB1), and indication information in SIB1 indicates which RACH configuration index corresponds to inter-slot frequency hopping.

In an embodiment, the terminal and the network side device may predefine which RACH configuration index corresponds to inter-slot frequency hopping.

Scheme 4: determining, based on a preamble index, the frequency hopping mode for the case in which repetition type A for the Msg3 PUSCH repetition is enabled.

In an embodiment, there is a given correspondence relationship between the preamble index and the frequency hopping mode. The frequency hopping mode includes intra-slot frequency hopping or inter-slot frequency hopping.

In an embodiment, the terminal may determine, based on the preamble index, the frequency hopping mode for the Msg3 PUSCH is intra-slot frequency hopping or inter-slot frequency hopping for the case in which repetition type A for the Msg3 PUSCH repetition is enabled and the FH flag is 1.

For example, in case that the frequency hopping is enabled and repetition type A for the Msg3 PUSCH repetition is enabled, the network side device may implicitly indicate the frequency hopping mode for the Msg3 PUSCH through different preamble indexes; or the terminal and the network side device may predefine through a protocol or indicate through SIB1 that the terminal determines which Msg3 PUSCH corresponding to the preamble index uses the inter-slot frequency hopping or the intra-slot frequency hopping.

Scheme 5: determining, based on broadcast information, the frequency hopping mode for the case in which repetition type A for the Msg3 PUSCH repetition is enabled.

In an embodiment, the terminal may determine, based on association information carried in the broadcast information, that the frequency hopping mode for Msg3 PUSCH is intra-slot frequency hopping or inter-slot frequency hopping for the case in which repetition type A for the Msg3 PUSCH repetition is enabled and the FH flag is 1.

In an embodiment, the network side device may indicate the frequency hopping mode for Msg3 PUSCH through broadcast information.

It should be noted that the broadcast information may be downlink control information (DCI) scheduling broadcast physical downlink shared channel (PDSCH), and the reserved bit in the DCI is used to indicate the frequency hopping mode; or the broadcast information is broadcast PDSCH, that is, the data carried by the broadcast PDSCH may be used by all terminals in the cell.

Scheme 6: determining, based on media access control (MAC) random access response (RAR), a frequency hopping mode corresponding to the MAC RAR for the case in which repetition type A for the Msg3 PUSCH repetition is enabled.

In an embodiment, the reserved bit in the MAC RAR indicates the frequency hopping mode. The frequency hopping mode includes intra-slot frequency hopping or inter-slot frequency hopping.

For example, the network side device may indicate the frequency hopping mode for the case in which repetition type A for the Msg3 PUSCH repetition is enabled to the terminal through MAC RAR; and the terminal determines the frequency hopping mode as intra-slot frequency hopping or inter-slot frequency hopping based on the reserved bit in the MAC RAR.

Through any one of the above schemes, in case that the terminal has enabled the Msg3 PUSCH repetition and frequency hopping, the terminal may determine the frequency hopping mode for the Msg3 PUSCH initial transmission. The frequency hopping mode includes intra-slot frequency hopping or inter-slot frequency hopping.

In addition, for the Msg3 PUSCH retransmission, any one of the following schemes may be used for determining, based on the indication information from the network side device or the predefined rule, the frequency hopping mode for Msg3 PUSCH.

Scheme 1: in case that repetition type A is enabled for the Msg3 PUSCH retransmission, determining a frequency hopping mode for Msg3 PUSCH initial transmission as a frequency hopping mode for the Msg3 PUSCH retransmission.

For example, in case that repetition type A is enabled for the Msg3 PUSCH retransmission, the frequency hopping mode for the Msg3 PUSCH initial transmission may be determined as the frequency hopping mode for the Msg3 PUSCH retransmission, that is, Msg3 PUSCH retransmission may be performed according to the frequency hopping mode for the Msg3 PUSCH initial transmission.

Scheme 2: in case that repetition type A is enabled for the Msg3 PUSCH retransmission, determining the frequency hopping mode for the Msg3 PUSCH retransmission based on target DCI.

In an embodiment, the target DCI is the DCI scheduling the Msg3 PUSCH retransmission, and a reserved bit in the target DCI indicates the frequency hopping mode for the Msg3 PUSCH retransmission.

For example, in case that repetition type A is enabled for the Msg3 PUSCH retransmission, the reserved bit in the DCI scheduling the Msg3 PUSCH retransmission may be used to indicate the frequency hopping mode for Msg3 PUSCH.

It should be noted that the indicated frequency hopping mode may include intra-slot frequency hopping or inter-slot frequency hopping.

In addition, in an embodiment, the terminal may determine, based on the indication information from the network side device or the predefined rule, the RV for Msg3 PUSCH, which may include the following steps:

determining an RV value for a first repetition of Msg3 PUSCH, and taking the RV value for the first repetition as a starting point, and determining subsequent RV values as RV values for subsequent repetitions.

For example, the terminal may determine the RV value for the first repetition of Msg3 PUSCH based on an explicit indication signaling transmitted from the network side device or a predefined rule, and then take the RV value for the first repetition as the starting point to determine the RV values for subsequent repetitions.

For example, in case that the RV value for the first repetition of Msg3 PUSCH is 0, the RV values for subsequent repetitions are {0 2 3 1 0 2 3 1 . . . }; and in case that the RV value for the first repetition of Msg3 PUSCH is 3, the value 3 is taken as the starting point and the RV values for subsequent repetitions are {3 1 0 2 3 1 0 2 . . . }.

In addition, any one of the following modes may be used to determine the RV value for the first repetition of Msg3 PUSCH.

Mode (1): determining the RV value for the first repetition of Msg3 PUSCH based on the DCI scheduling RAR, where a reserved bit in the DCI scheduling the RAR indicates the RV value.

For example, the network side device may indicate the RV value for the first repetition of Msg3 PUSCH using the reserved bit in the DCI scheduling RAR, and the terminal may determine the RV value for the first repetition of Msg3 PUSCH based on the reserved bits in the DCI scheduling RAR.

Mode (2): determining the RV value for the first repetition of Msg3 PUSCH based on MAC RAR, where the MAC RAR includes an RV bit indicator field and the RV bit indicator field indicates the RV value.

For example, the network side device may indicate the RV value for the first repetition of Msg3 PUSCH through the RV bit indicator field in the MAC RAR, and the terminal determines the RV value for the first repetition of Msg3 PUSCH through the RV bit indicator field in the MAC RAR.

For example, the RV bit indicator field may be 1-bit indication field or 2-bit indication field, which it is not limited in the present application.

Mode (3): determining the RV value for the first repetition of Msg3 PUSCH based on the UL grant, where a reserved bit in the UL grant indicates the RV value.

For example, the network side device may indicate the RV value for the first repetition of Msg3 PUSCH through the reserved bit in the UL grant, and the terminal determines the RV value for the first repetition of Msg3 PUSCH based on the reserved bit in the UL grant.

In an embodiment, the reserved bit used for indicating the RV value may be 1-bit.

The terminal may determine the RV value for the first repetition of Msg3 PUSCH by any one of the above modes. It should be noted that the indicated RV value includes at least RV0.

In the embodiments of the present application, the terminal determines, based on the indication information from the network side device or the predefined rule, the frequency hopping mode for Msg3 PUSCH and/or the RV for Msg3 PUSCH repetition, which increases the selection ranges for the frequency hopping mode and/or the RV. As such, the transmission performance of the uplink channel may be effectively improved, a problem that the traditional transmission method limits the transmission performance of the Msg3 PUSCH is solved, and the coverage range is increased.

Figure 2:
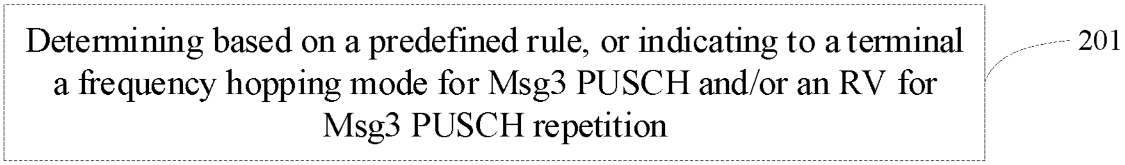
FIG. 2 is a schematic flowchart showing steps of an information determination method applied to a network side device according to an embodiment of the present application.

FIG. 2 is a schematic flowchart showing steps of an information determination method applied to a network side device according to an embodiment of the present application. As shown in FIG. 2, the information determination method includes the following steps:

step 201: determining based on a predefined rule, or indicating to a terminal a frequency hopping mode for message 3 (Msg3) PUSCH and/or a redundancy version (RV) for Msg3 PUSCH repetition;

where the terminal has enabled the Msg3 PUSCH repetition and frequency hopping in frequency domain.

In case that the terminal has enabled the Msg3 PUSCH repetition and the frequency hopping in a frequency domain, the network side device determines, based on the predefined rule, the frequency hopping mode and/or the RV for Msg3 PUSCH repetition for the terminal, or the network side device indicates the frequency hopping mode and/or the RV for Msg3 PUSCH repetition to the terminal, which increases selection ranges for the frequency hopping mode and/or the RV. The transmission performance for the uplink channel may be effectively improved, a problem that the traditional transmission method limits the transmission performance of the Msg3 PUSCH is solved, and the coverage range is increased.

In an embodiment, the frequency hopping mode for Msg3 PUSCH may be determined or indicated separately with respect to Msg3 PUSCH initial transmission and Msg3 PUSCH retransmission.

For the Msg3 PUSCH initial transmission, any one of the following schemes may be used for determining based on a predefined rule, or indicating to a terminal the frequency hopping mode for Msg3 PUSCH.

Scheme 1: transmitting a random access response (RAR) to the terminal.

In an embodiment, a reserved bit in the UL grant carried by the RAR is used for indicating the frequency hopping mode. The frequency hopping mode includes intra-slot frequency hopping or inter-slot frequency hopping.

Scheme 2: determining the frequency hopping mode based on whether repetition type A for the Msg3 PUSCH repetition is enabled.

In an embodiment, in case that Msg3 PUSCH is transmitted over a single slot, the frequency hopping mode is determined as intra-slot frequency hopping; or in case that Msg3 PUSCH is transmitted over multiple slots, the frequency hopping mode is determined as inter-slot frequency hopping.

Scheme 3: determining, based on a random access channel (RACH) configuration index, the frequency hopping mode for a case in which repetition type A for Msg3 PUSCH repetition is enabled.

In an embodiment, there is a given correspondence relationship between the RACH configuration index and the frequency hopping mode. The frequency hopping mode includes intra-slot frequency hopping or inter-slot frequency hopping.

Scheme 4: determining, based on a preamble index, the frequency hopping mode for a case in which repetition type A for the Msg3 PUSCH repetition is enabled.

In an embodiment, there is a given correspondence relationship between the preamble index and the frequency hopping mode. The frequency hopping mode includes intra-slot frequency hopping or inter-slot frequency hopping.

Scheme 5: indicating to the terminal, based on broadcast information, the frequency hopping mode for the case in which repetition type A for the Msg3 PUSCH repetition is enabled.

It should be noted that the broadcast information may be the DCI scheduling broadcast PDSCH, where the reserved bit in the DCI indicates the frequency hopping mode; or the broadcast information is broadcast PDSCH, that is, the data carried by the broadcast PDSCH may be used by all terminals in the cell.

Scheme 6: indicating to the terminal, based on a media access control (MAC) random access response (RAR), a frequency hopping mode corresponding to the MAC RAR for the case in which repetition type A for the Msg3 PUSCH repetition is enabled.

In an embodiment, the reserved bit in MAC RAR indicates the frequency hopping mode. The frequency hopping mode includes intra-slot frequency hopping or inter-slot frequency hopping.

Through any one of the above schemes, the terminal may determine the frequency hopping mode for the Msg3 PUSCH initial transmission. The frequency hopping mode includes intra-slot frequency hopping or inter-slot frequency hopping.

In addition, for the Msg3 PUSCH retransmission, the network side device may determine or indicate to the terminal, based on the predefined rule, the frequency hopping mode for Msg3 PUSCH, which may include any one of the following schemes.

Scheme 1: in case that repetition type A is enabled for the Msg3 PUSCH retransmission, determining a frequency hopping mode for Msg3 PUSCH initial transmission as a frequency hopping mode for the Msg3 PUSCH retransmission.

Scheme 2: in case that repetition type A is enabled for the Msg3 PUSCH retransmission, indicating the frequency hopping mode for the Msg3 PUSCH retransmission to the terminal based on target downlink control information (DCI).

In an embodiment, the target DCI is DCI scheduling the Msg3 PUSCH retransmission, and a reserved bit in the target DCI indicates the frequency hopping mode for the Msg3 PUSCH retransmission.

It should be noted that the indicated frequency hopping mode may include intra-slot frequency hopping or inter-slot frequency hopping.

In addition, in an embodiment, the network side device may determine or indicate to the terminal, based on the predefined rule, the RV for Msg3 PUSCH repetition, which may include the following steps:

indicating an RV value for a first repetition of Msg3 PUSCH to the terminal, and taking the RV value for the first repetition as a starting point, and determining subsequent RV values as RV values for subsequent repetitions.

In addition, the network side device indicates the RV value for the first repetition of Msg3 PUSCH to the terminal, which may include any one of the following modes.

Mode (1): indicating to the terminal the RV value for the first repetition of Msg3 PUSCH based on downlink control information (DCI) scheduling a random access response (RAR), where a reserved bit in the DCI scheduling the RAR indicates the RV value.

Mode (2): indicating to the terminal the RV value for the first repetition of Msg3 PUSCH based on media access control (MAC) random access response (RAR), where the MAC RAR includes an RV bit indicator field and the RV bit indicator field indicates the RV value.

Mode (3): indicating to the terminal the RV value for the first repetition of Msg3 PUSCH based on an uplink (UL) grant, where a reserved bit in the UL grant indicates the RV value.

The network side device may indicate the RV value for the first repetition of Msg3 PUSCH to the terminal by any one of the above modes. It should be noted that the indicated RV value includes at least RV0.

In the embodiments of the present application, the network side device determines or indicates to the terminal, based on the predefined rule, the frequency hopping mode for Msg3 PUSCH and/or the RV for Msg3 PUSCH repetition, which increases the selection ranges for the frequency hopping mode and/or the RV. As such, the transmission performance of the uplink channel can be effectively improved, a problem that the traditional transmission method limits the transmission performance of the Msg3 PUSCH is solved, and the coverage range is increased.

The present application is specified below by specific embodiments.

Embodiment 1

In order to enhance the coverage performance of Msg3 PUSCH, the protocol version Rel-17 coverage enhancement project supports repetition type A for Msg3 PUSCH repetition. In the embodiment, it is assumed that the terminal transmits the Msg3 PUSCH initial transmission using type A repetition. To ensure optimal transmission performance, it is necessary to switch between inter-slot frequency hopping and intra-slot frequency hopping.

In the embodiment, it is assumed that the network side device indicates the current frequency hopping (FH) as intra-slot frequency hopping or inter-slot frequency hopping based on the 1-bit reserved bit in the UL grant carried by the MAC RAR. For example, the information field carried by the UL grant is shown in the table below.

| RAR grant field | Number of bits |
|---|---|
| Frequency hopping flag | 1 |
| PUSCH frequency resource allocation | 14 |
| PUSCH time resource allocation | 4 |
| MCS | 4 |
| TPC command for PUSCH | 3 |
| CSI request | 1 |

The CSI request field is reserved, and in the embodiment, the reserved information bit is used to indicate the frequency hopping mode. The specific steps are as follows.

Step 1: the frequency hopping flag carried in the RAR grant field indicates that the frequency hopping in a frequency domain is enabled, and repetition type A for Msg3 PUSCH repetition is enabled.

Step 2: the network side device indicates, based on the 1-bit reserved information in the RAR grant field, that inter-slot frequency hopping or intra-slot frequency hopping is used for Msg3 PUSCH transmission. For example, the frequency hopping mode may be determined by any one of the following tables.

| Status of reserved bit | frequency hopping mode |
|---|---|
| 0 | Intra-slot FH |
| 1 | Inter-slot FH |

Or

| Status of reserved bit | frequency hopping mode |
|---|---|
| 0 | Inter-slot FH |
| 1 | Intra-slot FH |

The terminal determines, based on the indication from the network side device, the frequency hopping mode for Msg3 PUSCH.

Embodiment 2

In the embodiment, it is assumed that the terminal transmits the Msg3 PUSCH initial transmission using type A repetition. To ensure optimal transmission performance, it is necessary to switch between inter-slot frequency hopping and intra-slot frequency hopping.

In this embodiment, the network side device and the terminal determine, based on whether repetition type A for Msg3 PUSCH repetition is enabled, the FH as intra-slot frequency hopping or inter-slot frequency hopping. The specific steps are as follows.

Step 1: the frequency hopping flag carried in the RAR grant field indicates that the frequency hopping is enabled, and repetition type A for Msg3 PUSCH repetition is enabled.

Step 2: the network side device and the terminal determine, based on whether repetition type A for Msg3 PUSCH is enabled, the FH as intra-slot frequency hopping or inter-slot frequency hopping. In case that Msg3 is transmitted over a single slot, the FH is determined as intra-slot frequency hopping; or in case that the Msg3 is transmitted over multiple slots, the FH is determined as inter-slot frequency hopping.

In case that the terminal transmits Msg3 PUSCH, the frequency hopping mode is determined according to the above steps.

Embodiment 3

In the embodiment, it is assumed that the terminal transmits the Msg3 PUSCH initial transmission using type A repetition. To ensure optimal transmission performance, it is necessary to switch between inter-slot frequency hopping and intra-slot frequency hopping.

In this embodiment, it is assumed that the network side device implicitly indicates, based on different RACH configuration indexes, the frequency hopping mode for Msg3 PUSCH repetition in case that frequency hopping in frequency domain is enabled and repetition type A for Msg3 PUSCH repetition is enabled.

In an embodiment, on the basis of the RACH configuration configured in the system information block 1 (SIB1), an additional resource is configured for RACH transmission, and the indication information in the SIB1 indicates that which RACH configuration index corresponds to inter-slot frequency hopping. It is assumed that the SIB1 is configured with two RACH configurations (including index #1 and index #22) for RACH transmission, and the network side device indicates that the inter-slot frequency hopping is used for Msg3 PUSCH in case that the terminal transmits a preamble on the RACH configuration of index 22, the frequency hopping flag carried in the corresponding RAR grant field indicates that the frequency hopping is enabled, and repetition type A for Msg3 PUSCH repetition is enabled. On the contrary, even in case that the frequency hopping flag carried in the RAR grant field indicates that the frequency hopping is enabled and repetition type A for Msg3 PUSCH repetition is enabled, the intra-slot frequency hopping is used for Msg3 PUSCH.

Embodiment 4

In the embodiment, it is assumed that the terminal transmits the Msg3 PUSCH initial transmission using type A repetition. To ensure optimal transmission performance, it is necessary to switch between inter-slot frequency hopping and intra-slot frequency hopping.

In this embodiment, it is assumed that the network side device implicitly indicates, based on different preamble indexes, the frequency hopping mode for Msg3 PUSCH repetition in case that frequency hopping in frequency domain is enabled and repetition type A for Msg3 PUSCH repetition is enabled.

The network side device informs, in a manner of predefined protocol or an SIB1 indication, the terminal that which Msg3 PUSCH corresponding to the preamble index is transmitted using inter-slot or intra-slot frequency hopping.

In an embodiment, it is assumed that the Msg3 PUSCH corresponding to preamble index {#1-#32} is transmitted using inter-slot frequency hopping. For example, the terminal transmits preamble #1 and the inter-slot frequency hopping is used for Msg3 PUSCH for the case in which the frequency hopping flag carried in the RAR grant field indicates that the frequency hopping in a frequency domain is enabled and repetition type A for Msg3 PUSCH repetition is enabled. For another example, the terminal transmits preamble #56 and the intra-slot frequency hopping is used for Msg3 PUSCH for the case in which the frequency hopping flag carried in the RAR grant field indicates that the frequency hopping in a frequency domain is enabled and repetition type A for Msg3 PUSCH repetition is enabled.

Embodiment 5

In the embodiment, it is assumed that the terminal transmits the Msg3 PUSCH initial transmission using type A repetition. To ensure optimal transmission performance, it is necessary to switch between inter-slot frequency hopping and intra-slot frequency hopping.

In this embodiment, it is assumed that the network side device indicates, based on the reserved bits in the DCI scheduling broadcast PDSCH or the association information in the broadcast PDSCH, that inter-slot frequency hopping or intra-slot frequency hopping is used for Msg3 PUSCH for the case in which the frequency hopping flag carried in the RAR grant field indicates that the frequency hopping in a frequency domain is enabled and repetition type A for Msg3 PUSCH repetition is enabled.

Embodiment 6

In the embodiment, it is assumed that the terminal transmits the Msg3 PUSCH initial transmission using type A repetition. To ensure optimal transmission performance, it is necessary to switch between inter-slot frequency hopping and intra-slot frequency hopping.

In this embodiment, it is assumed that the base station indicates, based on the 1-bit reserved bit carried by MAC RAR, the FH as intra-slot frequency hopping or inter-slot frequency hopping. For example, the information field of the MAC RAR is shown in the following table.

| | |
|---|---|
| R | Timing Advance Command |
| Timing Advance Command | UL Grant |
| UL Grant | |
| UL Grant | |
| UL Grant | |
| Temporary C-RNTI | |
| Temporary C-RNTI | |

R is the reserved 1-bit. In this embodiment, the following steps are included.

Step 1: The frequency hopping flag carried in the RAR grant field indicates that the frequency hopping is enabled, and repetition type A for Msg3 PUSCH repetition is enabled.

Step 2: The network side device indicates, based on the 1-bit reserved information in the MAC RAR, that Msg3 PUSCH is transmitted using inter-slot frequency hopping or intra-slot frequency hopping. For example, the frequency hopping mode may be determined by any one of the following tables.

| Status of reserved bit | frequency hopping mode |
|---|---|
| 0 | Intra-slot FH |
| 1 | Inter-slot FH |

Or

| Status of reserved bit | frequency hopping mode |
|---|---|
| 0 | Inter-slot FH |
| 1 | Intra-slot FH |

The terminal determines, based on the indication of the network side device, the frequency hopping mode for Msg3 PUSCH.

Embodiment 7

In the embodiment, it is assumed that the terminal transmits the Msg3 PUSCH retransmission using type A repetition. To ensure optimal transmission performance, it is necessary to switch between inter-slot frequency hopping and intra-slot frequency hopping.

In this embodiment, the Msg3 PUSCH retransmission is performed according to the frequency hopping mode for the Msg3 PUSCH initial transmission.

In an embodiment, in case that repetition type A is enabled for Msg3 PUSCH retransmission, the Msg3 PUSCH retransmission is performed according to the frequency hopping mode for the Msg3 PUSCH initial transmission.

Embodiment 8

In the embodiment, it is assumed that the terminal transmits the Msg3 PUSCH retransmission using type A repetition. To ensure optimal transmission performance, it is necessary to switch between inter-slot frequency hopping and intra-slot frequency hopping.

In this embodiment, the reserved bit in the DCI scheduling the Msg3 PUSCH retransmission is used to indicate the frequency hopping mode for the Msg3 PUSCH retransmission in case that repetition type A is enabled for the Msg3 PUSCH retransmission.

In an embodiment, the 1-bit of the reserved bits is used to indicate that the Msg3 PUSCH retransmission scheduled by the DCI uses inter-slot frequency hopping or intra-slot frequency hopping.

Embodiment 9

In the embodiment, it is assumed that the terminal transmits the Msg3 PUSCH using type A repetition. To ensure optimal transmission performance, it is necessary to indicate the RV for Msg3 PUSCH.

In this embodiment, the reserved bit in the DCI scheduling a random access response (RAR) is used to determine the RV value for the first repetition of the corresponding Msg3. It should be noted that the indicated RV includes at least RV0.

For example, 2 bits in the reserved bits are used to indicate that one version in RV #0-RV #3 is used for the first repetition of Msg3 PUSCH.

Embodiment 10

In the embodiment, it is assumed that the terminal transmits the Msg3 PUSCH using type A repetition. To ensure optimal transmission performance, it is necessary to indicate the RV for Msg3 PUSCH.

In this embodiment, a 1 or 2 bit indication fields are added to the corresponding MAC RAR to indicate the RV for the first repetition of the corresponding Msg3 PUSCH. It should be noted that the indicated RV includes at least RV0.

For example, the 2 bits are used to indicate that one version in RV #0-RV #3 is used for the first repetition of the Msg3 PUSCH.

Embodiment 11

In the embodiment, it is assumed that the terminal transmits the Msg3 PUSCH using type A repetition. To ensure optimal transmission performance, it is necessary to indicate the RV for Msg3 PUSCH.

In this embodiment, the 1-bit reserved bit in UL grant is used to indicate the RV for the first repetition. The two RVs indicated by the 1-bit include at least RV0. For example, RV0 or RV1 is indicated.

By the above embodiments, the frequency hopping mode and/or the RV is determined by any one of the above schemes.

Figure 3:
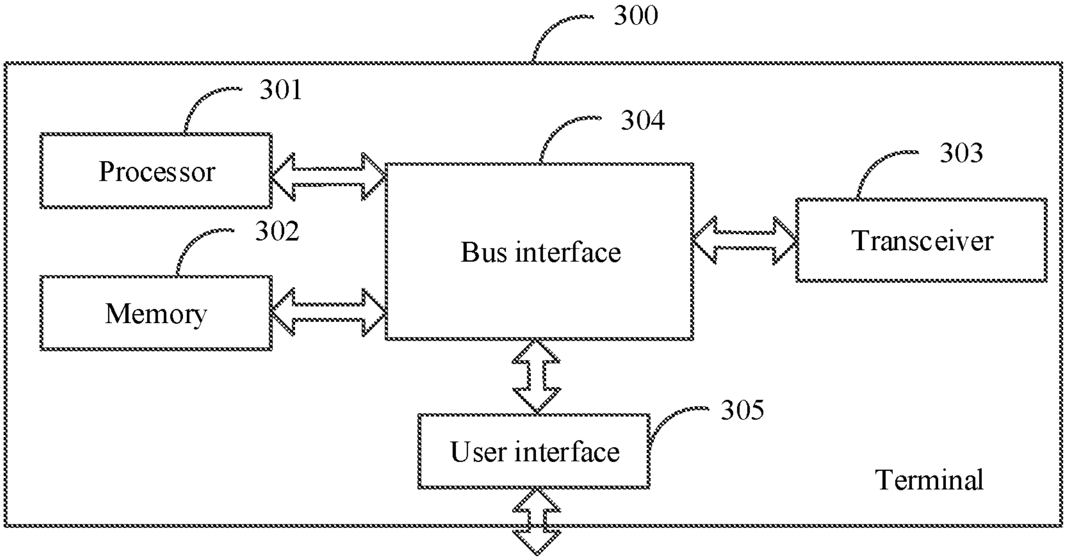
FIG. 3 is a schematic structural diagram of a terminal according to an embodiment of the present application.

FIG. 3 is a schematic structural diagram of a terminal according to an embodiment of the present application. As shown in FIG. 3, the terminal 300 includes a memory 302, a transceiver 303, and a processor 301; where the processor 301 and the memory 302 may also be physically arranged separately.

The memory 302 is used to store computer programs; and the transceiver 303 is used to transmit and receive data under the control of the processor 301.

In FIG. 3, the bus system 304 may include any number of interconnected buses and bridges, which are linked together by one or more processors represented by the processor 301 and various circuits of the memory represented by the memory 302. The bus system 304 may link various other circuits such as peripheral devices, regulators, and power management circuits together. The bus interface provides an interface. The transceiver 303 may be multiple components, i.e., including a transmitter and a receiver, providing a unit for communicating with various other devices on the transmission medium, and the transmission medium includes wireless channels, wired channels, optical cables, and other transmission media. For different user devices, the user interface 305 may also be an interface that may connect external and internal devices, and the connected devices include but not limited to keyboards, displays, speakers, microphones, joysticks, etc.

The processor 301 is responsible for managing the bus architecture and the usual processing, and the memory 302 may store data used by the processor 301 in performing operations.

In an embodiment, the processor 301 may be a central processing unit (CPU), an application specific integrated circuit (ASIC), a field-programmable gate array (FPGA), or a complex programmable logic device (CPLD), and the processor may also adopt multi-core architecture.

The processor 301 is used to execute, according to the obtained executable instructions by calling the computer programs stored in the memory 302, any one of the methods provided by embodiments of the present application. For example, the method includes:

determining, based on indication information from a network side device or a predefined rule, a frequency hopping mode for message 3 (Msg3) physical uplink shared channel (PUSCH) and/or a redundancy version (RV) for Msg3 PUSCH repetition; where the terminal has enabled the Msg3 PUSCH repetition and the frequency hopping in a frequency domain.

In an embodiment, for Msg3 PUSCH initial transmission, the determining, based on the indication information from the network side device or the predefined rule, the frequency hopping mode for Msg3 PUSCH includes any one of the followings:

determining the frequency hopping mode based on an uplink (UL) grant carried by a random access response (RAR), where a reserved bit in the UL grant is used to indicate the frequency hopping mode;

determining the frequency hopping mode based on whether repetition type A for the Msg3 PUSCH repetition is enabled;

determining, based on a random access channel (RACH) configuration index, the frequency hopping mode for a case in which repetition type A for the Msg3 PUSCH repetition is enabled, where a correspondence relationship between the RACH configuration index and the frequency hopping mode is given;

determining, based on a preamble index, the frequency hopping mode for the case in which repetition type A for the Msg3 PUSCH repetition is enabled, where a correspondence relationship between the preamble index and the frequency hopping mode is given;

determining, based on broadcast information, the frequency hopping mode for the case in which repetition type A for the Msg3 PUSCH repetition is enabled; and determining, based on media access control (MAC) random access response (RAR), a frequency hopping mode corresponding to the MAC RAR for the case in which repetition type A for the Msg3 PUSCH repetition is enabled, where a reserved bit in the MAC RAR indicates the frequency hopping mode;

where the frequency hopping mode includes intra-slot frequency hopping or inter-slot frequency hopping.

In an embodiment, the determining the frequency hopping mode based on whether repetition type A for the Msg3 PUSCH repetition is enabled includes:

in case that Msg3 PUSCH is transmitted over a single slot, determining the frequency hopping mode as intra-slot frequency hopping; or in case that the Msg3 PUSCH is transmitted over multiple slots, determining the frequency hopping mode as inter-slot frequency hopping.

In an embodiment, the broadcast information is downlink control information (DCI) scheduling broadcast physical downlink shared channel (PDSCH), where a reserved bit in the DCI indicates the frequency hopping mode; or the broadcast information is broadcast PDSCH.

In an embodiment, for Msg3 PUSCH retransmission, the determining, based on the indication information from the network side device or the predefined rule, the frequency hopping mode for Msg3 PUSCH, includes:

in case that repetition type A is enabled for the Msg3 PUSCH retransmission, determining a frequency hopping mode for Msg3 PUSCH initial transmission as a frequency hopping mode for the Msg3 PUSCH retransmission; or in case that repetition type A is enabled for the Msg3 PUSCH retransmission, determining the frequency hopping mode for the Msg3 PUSCH retransmission based on target DCI; where the target DCI is DCI scheduling the Msg3 PUSCH retransmission, and a reserved bit in the target DCI indicates the frequency hopping mode for the Msg3 PUSCH retransmission.

In an embodiment, the determining, based on the indication information from the network side device or the predefined rule, the RV for Msg3 PUSCH, includes:

determining an RV value for a first repetition of Msg3 PUSCH; and taking the RV value for the first repetition as a starting point, and determining subsequent RV values as RV values for subsequent repetitions.

In an embodiment, the determining the RV value for the first repetition of Msg3 PUSCH includes any one of the followings:

determining the RV value for the first repetition of Msg3 PUSCH based on DCI scheduling an RAR, where a reserved bit in the DCI scheduling the RAR indicates the RV value;

determining the RV value for the first repetition of Msg3 PUSCH based on MAC RAR, where the MAC RAR includes an RV bit indicator field and the RV bit indicator field indicates the RV value;

determining the RV value for the first repetition of Msg3 PUSCH based on a UL grant, where a reserved bit in the UL grant indicates the RV value.

In an embodiment, the RV value includes at least RV0.

In the embodiments of the present application, the terminal determines the frequency hopping mode for Msg3 PUSCH and/or the RV for Msg3 PUSCH repetition, which increases the selection ranges for the frequency hopping mode and/or the RV by determining. As such, the transmission performance of the uplink channel may be effectively improved, a problem that the traditional transmission method limits the transmission performance of the Msg3 PUSCH is solved, and the coverage range is increased.

Figure 4:
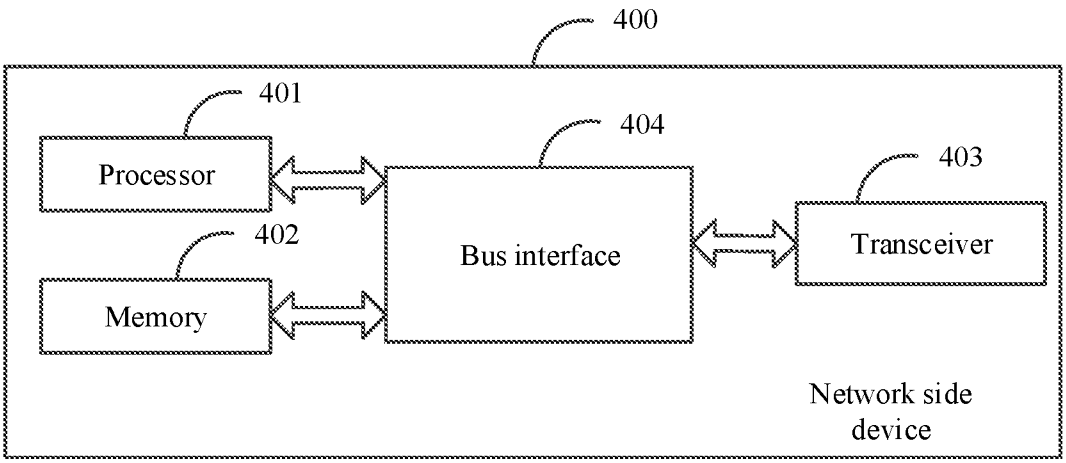
FIG. 4 is a schematic structural diagram of a network side device according to an embodiment of the present application.

FIG. 4 is a schematic structural diagram of a network side device according to an embodiment of the present application. As shown in FIG. 4, the network device 400 includes a memory 402, a transceiver 403, and a processor 401; where the processor 401 and the memory 402 may also be physically arranged separately.

The memory 402 is used to store computer programs; and the transceiver 403 is used to transmit and receive data under a control of the processor 401.

In FIG. 4, the bus system 404 may include any number of interconnected buses and bridges, which are linked together by one or more processors represented by the processor 401 and various circuits of the memory represented by the memory 402 are linked together. The bus system 404 may also link various other circuits such as peripheral devices, regulators, and power management circuits together. The bus interface provides an interface. The transceiver 403 may be multiple components, i.e., including a transmitter and a receiver, providing a unit for communicating with various other devices on the transmission medium, and the transmission medium includes wireless channels, wired channels, optical cables, and other transmission media. The processor 401 is responsible for managing the bus architecture and the usual processing, and the memory 402 may store data used by the processor 401 in performing operation.

The processor 401 may be a central processing unit (CPU), an application specific integrated circuit (ASIC), a field-programmable gate array (FPGA), or a complex programmable logic device (CPLD), and the processor may also adopt multi-core architecture.

The processor 401 is used to execute, according to the obtained executable instructions by calling the computer programs stored in the memory 402, any one of the methods provided by embodiments of the present application. For example, the method includes:

determining based on a predefined rule, or indicating to a terminal the frequency hopping mode for message 3 (Msg3) physical uplink shared channel (PUSCH) and/or a redundancy version (RV) for Msg3 PUSCH repetition; where the terminal has enabled the Msg3 PUSCH repetition and frequency hopping in frequency domain.

In an embodiment, for Msg3 PUSCH initial transmission, the determining based on the predefined rule, or indicating to the terminal the frequency hopping mode for Msg3 PUSCH, includes any one of the followings:

transmitting a random access response RAR to the terminal, where a reserved bit in an uplink (UL) grant carried by the RAR is used to indicate the frequency hopping mode;

determining the frequency hopping mode based on whether repetition type A for the Msg3 PUSCH repetition is enabled;

determining, based on a random access channel (RACH) configuration index, the frequency hopping mode for a case in which repetition type A for the Msg3 PUSCH repetition is enabled, where a correspondence relationship between the RACH configuration index and the frequency hopping mode is given;

determining, based on a preamble index, the frequency hopping mode for the case in which repetition type A for the Msg3 PUSCH repetition is enabled, where a correspondence relationship between the preamble index and the frequency hopping mode is given;

indicating to the terminal, based on broadcast information, the frequency hopping mode for the case in which repetition type A for the Msg3 PUSCH repetition is enabled; and indicating to the terminal, based on media access control (MAC) random access response (RAR), a frequency hopping mode corresponding to the MAC RAR for the case in which repetition type A for the Msg3 PUSCH repetition is enabled, where a reserved bit in the MAC RAR indicates the frequency hopping mode;

where the frequency hopping mode includes intra-slot frequency hopping or inter-slot frequency hopping.

In an embodiment, the determining the frequency hopping mode based on whether repetition type A for the Msg3 PUSCH repetition is enabled includes:

in case that Msg3 PUSCH is transmitted over a single slot, determining the frequency hopping mode as intra-slot frequency hopping; or in case that the Msg3 PUSCH is transmitted over multiple slots, determining the frequency hopping mode as inter-slot frequency hopping.

In an embodiment, the broadcast information is downlink control information (DCI) scheduling broadcast physical downlink shared channel (PDSCH), where a reserved bit in the DCI indicates the frequency hopping mode; or the broadcast information is broadcast PDSCH.

In an embodiment, for Msg3 PUSCH retransmission, the determining based on the predefined rule, or indicating to the terminal the frequency hopping mode for Msg3 PUSCH, includes:

in case that repetition type A is enabled for the Msg3 PUSCH retransmission, determining a frequency hopping mode for Msg3 PUSCH initial transmission as a frequency hopping mode for the Msg3 PUSCH retransmission; or in case that repetition type A is enabled for the Msg3 PUSCH retransmission, indicating to the terminal the frequency hopping mode for the Msg3 PUSCH retransmission based on target DCI; where the target DCI is DCI scheduling the Msg3 PUSCH retransmission, and a reserved bit in the target DCI indicates the frequency hopping mode for the Msg3 PUSCH retransmission.

In an embodiment, the determining based on the predefined rule, or indicating to the terminal the RV for Msg3 PUSCH, includes:

indicating an RV value for a first repetition of Msg3 PUSCH to the terminal;

taking the RV value for the first repetition as a starting point, and determining subsequent RV values as RV values for subsequent repetitions.

In an embodiment, the indicating the RV value for the first repetition of Msg3 PUSCH to the terminal includes any one of the followings:

indicating to the terminal the RV value for the first repetition of Msg3 PUSCH based on DCI scheduling an RAR, where the reserved bit in the DCI scheduling the RAR indicates the RV value;

indicating to the terminal the RV value for the first repetition of Msg3 PUSCH based on MAC RAR, where the MAC RAR includes an RV bit indicator field and the RV bit indicator field indicates the RV value;

indicating to the terminal the RV value for the first repetition of Msg3 PUSCH based on a UL grant, where a reserved bit in the UL grant indicates the RV value.

In an embodiment, the RV value includes at least RV0.

It should be noted here that the above-mentioned terminal and network side device provided by the embodiments of the present application may implement all the method steps in the above-mentioned method embodiments, and may achieve the same effect. The same parts and beneficial effects as the same method embodiments are not repeated in the present application.

Figure 5:
FIG. 5 is a schematic block diagram of an information determination apparatus applied to a terminal according to an embodiment of the present application.

FIG. 5 is a schematic block diagram of an information determination apparatus applied to a terminal according to an embodiment of the present application, and the apparatus includes:

a determination device 501, which is used for determining, based on indication information from a network side device or a predefined rule, a frequency hopping mode for message 3 (Msg3) physical uplink shared channel (PUSCH) and/or a redundancy version (RV) for Msg3 PUSCH repetition; where the terminal has enabled the Msg3 PUSCH repetition and frequency hopping in frequency domain.

In an embodiment, for Msg3 PUSCH initial transmission, the determination device is used for performing any one of the followings:

determining the frequency hopping mode based on an uplink (UL) grant carried by a random access response (RAR), where a reserved bit in the UL grant is used to indicate the frequency hopping mode;

determining the frequency hopping mode based on whether repetition type A for the Msg3 PUSCH repetition is enabled;

determining, based on a random access channel (RACH) configuration index, the frequency hopping mode for a case in which repetition type A for the Msg3 PUSCH repetition is enabled, where a correspondence relationship between the RACH configuration index and the frequency hopping mode is given;

determining, based on a preamble index, the frequency hopping mode for the case in which repetition type A for the Msg3 PUSCH repetition is enabled, where a correspondence relationship between the preamble index and the frequency hopping mode is given;

determining, based on broadcast information, the frequency hopping mode for the case in which repetition type A for the Msg3 PUSCH repetition is enabled; and determining, based on media access control (MAC) random access response (RAR), a frequency hopping mode corresponding to the MAC RAR for the case in which repetition type A for the Msg3 PUSCH repetition is enabled, where a reserved bit in the MAC RAR indicates the frequency hopping mode;

where the frequency hopping mode includes intra-slot frequency hopping or inter-slot frequency hopping.

In an embodiment, the determining the frequency hopping mode based on whether repetition type A for the Msg3 PUSCH repetition is enabled includes:

in case that Msg3 PUSCH is transmitted over a single slot, determining the frequency hopping mode as intra-slot frequency hopping; or in case that the Msg3 PUSCH is transmitted over multiple slots, determining the frequency hopping mode as inter-slot frequency hopping.

In an embodiment, the broadcast information is downlink control information (DCI) scheduling broadcast physical downlink shared channel (PDSCH), where a reserved bit in the DCI indicates the frequency hopping mode; or the broadcast information is broadcast PDSCH.

In an embodiment, for Msg3 PUSCH retransmission, the determination device is used for performing any one of the followings:

in case that repetition type A is enabled for the Msg3 PUSCH retransmission, determining a frequency hopping mode for Msg3 PUSCH initial transmission as the frequency hopping mode for the Msg3 PUSCH retransmission; or in case that repetition type A is enabled for the Msg3 PUSCH retransmission, determining the frequency hopping mode for the Msg3 PUSCH retransmission based on target DCI; where the target DCI is DCI scheduling the Msg3 PUSCH retransmission, and a reserved bit in the target DCI indicates the frequency hopping mode for the Msg3 PUSCH retransmission.

In an embodiment, the determining, based on the indication information from the network side device or the predefined rule, the RV for Msg3 PUSCH, includes:

determining an RV value for a first repetition of Msg3 PUSCH; and taking the RV value for the first repetition as a starting point, and determining subsequent RV values as RV values for subsequent repetitions.

In an embodiment, the determining the RV value for the first repetition of Msg3 PUSCH includes any one of the followings:

determining the RV value for the first repetition of Msg3 PUSCH based on DCI scheduling an RAR, where the reserved bit in the DCI scheduling the RAR indicates the RV value;

determining the RV value for the first repetition of Msg3 PUSCH based on MAC RAR, where the MAC RAR includes an RV bit indicator field and the RV bit indicator field indicates the RV value;

determining the RV value for the first repetition of Msg3 PUSCH based on a UL grant, where a reserved bit in the UL grant indicates the RV value.

In an embodiment, the RV value includes at least RV0.

Figure 6:
FIG. 6 is a schematic block diagram of an information determination apparatus applied to a network side device according to an embodiment of the present application.

FIG. 6 is a schematic block diagram of an information determination apparatus applied to a network side device according to an embodiment of the present application, and the apparatus includes:

an indication device 601, which is used for determining based on a predefined rule, or indicating to a terminal a frequency hopping mode for message 3 (Msg3) physical uplink shared channel (PUSCH) and/or a redundancy version (RV) for Msg3 PUSCH repetition; where the terminal has enabled the Msg3 PUSCH repetition and the frequency hopping in a frequency domain.

In an embodiment, for Msg3 PUSCH initial transmission, the indication device is used for performing any one of the followings:

transmitting a random access response RAR to the terminal, where a reserved bit in an uplink (UL) grant carried by the RAR is used to indicate the frequency hopping mode;

determining the frequency hopping mode based on whether repetition type A for the Msg3 PUSCH repetition is enabled;

determining, based on a random access channel (RACH) configuration index, the frequency hopping mode for a case in which repetition type A for the Msg3 PUSCH repetition is enabled, where a correspondence relationship between the RACH configuration index and the frequency hopping mode is given;

determining, based on a preamble index, the frequency hopping mode for the case in which repetition type A for the Msg3 PUSCH repetition is enabled, where a correspondence relationship between the preamble index and the frequency hopping mode is given;

indicating to the terminal, based on broadcast information, the frequency hopping mode for the case in which repetition type A for the Msg3 PUSCH repetition is enabled; and indicating to the terminal, based on media access control (MAC) random access response (RAR), a frequency hopping mode corresponding to the MAC RAR for the case in which repetition type A for the Msg3 PUSCH repetition is enabled, where a reserved bit in the MAC RAR indicates the frequency hopping mode;

where the frequency hopping mode includes intra-slot frequency hopping or inter-slot frequency hopping.

In an embodiment, the determining the frequency hopping mode based on whether repetition type A for the Msg3 PUSCH repetition is enabled includes:

in case that the Msg3 PUSCH is transmitted over a single slot, determining the frequency hopping mode as intra-slot frequency hopping; or in case that the Msg3 PUSCH is transmitted over multiple slots, determining the frequency hopping mode as inter-slot frequency hopping.

In an embodiment, the broadcast information is downlink control information (DCI) scheduling broadcast physical downlink shared channel (PDSCH), where a reserved bit in the DCI indicates the frequency hopping mode; or the broadcast information is broadcast PDSCH.

In an embodiment, for Msg3 PUSCH retransmission, the indication device is used for:

in case that repetition type A is enabled for the Msg3 PUSCH retransmission, determining a frequency hopping mode for Msg3 PUSCH initial transmission as a frequency hopping mode for the Msg3 PUSCH retransmission; or in case that repetition type A is enabled for the Msg3 PUSCH retransmission, indicating to the terminal the frequency hopping mode for the Msg3 PUSCH retransmission based on target DCI; where the target DCI is DCI scheduling the Msg3 PUSCH retransmission, and a reserved bit in the target DCI indicates the frequency hopping mode for the Msg3 PUSCH retransmission.

In an embodiment, the determining based on the predefined rule, or indicating to the terminal the RV for Msg3 PUSCH repetition, includes:

indicating an RV value for a first repetition of Msg3 PUSCH to the terminal;

taking the RV value for the first repetition as a starting point, and determining subsequent RV values as RV values for subsequent repetitions.

In an embodiment, the indicating the RV value for the first repetition of Msg3 PUSCH to the terminal includes any one of the followings:

indicating to the terminal the RV value for the first repetition of Msg3 PUSCH based on DCI scheduling an RAR, where a reserved bit in the DCI scheduling the RAR indicates the RV value;

indicating to the terminal the RV value for the first repetition of Msg3 PUSCH based on MAC RAR, where the MAC RAR includes an RV bit indicator field and the RV bit indicator field indicates the RV value;

indicating to the terminal the RV value for the first repetition of Msg3 PUSCH based on a UL grant, where a reserved bit in the UL grant indicates the RV value.

In an embodiment, the RV value includes at least RV0.

It should be noted that the division of units in the embodiments of the present application is schematic and is only a logical functional division, and there may be other division schemes in actual implementation. In addition, each functional unit in each embodiment of the present application may be integrated in a single processing unit, or each unit may physically exist separately, or two or more units may be integrated in a single unit. The above integrated units may be implemented either in the form of hardware or in the form of software functional units.

The integrated unit may be stored in a processor readable storage medium in case that it is implemented in the form of a software functional unit and sold or used as a separate product. Based on this understanding, the solutions of the present application in essence, or the part contributing to the related art, or all or part of the solutions may be embodied in the form of a software product, which is stored in a storage medium and includes several instructions to enable a computer device (which may be a personal computer, a server, or a network device, etc.) or processor to perform all or part of the steps of the methods described in various embodiments of the present application. The aforementioned storage medium includes: USB flash disk, movable hard drives, read-only memory (ROM), random access memory (RAM), magnetic disks, or optical discs, and other media that may store program code.

It should be noted here that the above-mentioned apparatuses provided by the embodiments of the present application may implement all the method steps in the above-mentioned method embodiments, and may achieve the same effect. The same parts and beneficial effects as the same method embodiments are not repeated in the present application.

An embodiment of the present application provides a processor readable storage medium, where the processor readable storage medium stores a computer program, and the computer program, when executed by a processor, causes the processor to perform any one of the methods in the aforementioned embodiment.

The processor readable storage medium may be any available medium or data storage device that the processor may access, including but not limited to magnetic memory (such as floppy disks, hard disks, magnetic tapes, magneto-optical disks (MO), etc.), optical memory (such as CD, DVD, BD, HVD, etc.), and semiconductor memory (such as ROM, EPROM, EEPROM, non-volatile memory (NAND FLASH), solid-state drive (SSD), etc.).

As seen in the above embodiments, the processor readable storage medium stores a computer program used to cause the processor to perform the information determination scheme described above.

Embodiments of the present application may be provided as schemes, systems, or computer program products. Therefore, the present application may take the form of complete hardware embodiments, complete software embodiments, or embodiments combining software and hardware aspects. Moreover, the present application may take the form of computer program products implemented on one or more computer available storage media (including but not limited to disk storage and optical storage, etc.) containing computer available program code.

The present application is described with reference to flowcharts and/or block diagrams of schemes, devices (systems), and computer program products according to embodiments of the present application. It should be understood that each process and/or box in the flowchart and/or block diagram, as well as the combination of processes and/or boxes in the flowchart and/or block diagram, may be implemented by computer executable instructions. These computer executable instructions may be provided to processors of general purpose computers, specialized computers, embedded processors, or other programmable data processing devices to produce a machine and the indication executed by processors of computers or other programmable data processing devices may produce devices for implementing the functions specified in one or more processes of the flowchart and/or one or more boxes of the block diagram.

These processor executable instructions may also be stored in a processor readable memory capable of directing a computer or other programmable data processing device to operate in a particular manner and the indication stored in the processor readable memory produce manufactured products including indication devices that implement the function specified in one or more processes of a flowchart and/or one or more boxes of a block diagram.

These processor executable instructions may also be loaded onto a computer or other programmable data processing device and a series of operational steps are performed on the computer or other programmable device to produce computer-implemented processing, and the indication executed on the computer or other programmable device provide steps for implementing the functions specified in one or more processes of the flowchart and/or one or more boxes of the block diagram.

Various changes and variations to the present application can be made. In this way, in case that these modifications and variations of the present application are within the scope of the claims of the present application and their equivalent technologies, the present application also intends to include these modifications and variations as well.

What is claimed is:

1. An information determination method, applied to a terminal, comprising:

determining, based on a predefined rule, a frequency hopping mode for message 3 (Msg3) physical uplink shared channel (PUSCH); wherein the terminal has enabled the Msg3 PUSCH repetition and frequency hopping in frequency domain;

wherein for Msg3 PUSCH initial transmission, the determining, based on the predefined rule, the frequency hopping mode for Msg3 PUSCH comprises any one of the following:

determining the frequency hopping mode based on whether repetition type A for the Msg3 PUSCH repetition is enabled; or determining, based on a preamble index, the frequency hopping mode for the case in which repetition type A for the Msg3 PUSCH repetition is enabled, wherein a correspondence relationship between the preamble index and the frequency hopping mode is given;

wherein the frequency hopping mode comprises intra-slot frequency hopping or inter-slot frequency hopping.

2. The method of claim 1, wherein for Msg3 PUSCH retransmission, the determining, based on the predefined rule, the frequency hopping mode for Msg3 PUSCH, comprises:

in case that repetition type A is enabled for the Msg3 PUSCH retransmission, determining a frequency hopping mode for Msg3 PUSCH initial transmission as a frequency hopping mode for the Msg3 PUSCH retransmission; or in case that repetition type A is enabled for the Msg3 PUSCH retransmission, determining the frequency hopping mode for the Msg3 PUSCH retransmission based on target DCI; wherein the target DCI is DCI scheduling the Msg3 PUSCH retransmission, and a reserved bit in the target DCI indicates the frequency hopping mode for the Msg3 PUSCH retransmission.

3. An information determination method, applied to a network side device, comprising:

determining, based on a predefined rule, a frequency hopping mode for message 3 (Msg3) physical uplink shared channel (PUSCH); wherein the terminal has enabled the Msg3 PUSCH repetition and frequency hopping in frequency domain;

wherein for Msg3 PUSCH initial transmission, the determining, based on the predefined rule, the frequency hopping mode for Msg3 PUSCH, comprises any one of the following:

determining the frequency hopping mode based on whether repetition type A for the Msg3 PUSCH repetition is enabled; or determining, based on a preamble index, the frequency hopping mode for the case in which repetition type A for the Msg3 PUSCH repetition is enabled, wherein a correspondence relationship between the preamble index and the frequency hopping mode is given;

wherein the frequency hopping mode comprises intra-slot frequency hopping or inter-slot frequency hopping.

4. The method of claim 3, wherein for Msg3 PUSCH retransmission, the determining, based on the predefined rule, the frequency hopping mode for Msg3 PUSCH, comprises:

in case that repetition type A is enabled for the Msg3 PUSCH retransmission, determining a frequency hopping mode for Msg3 PUSCH initial transmission as a frequency hopping mode for the Msg3 PUSCH retransmission; or in case that repetition type A is enabled for the Msg3 PUSCH retransmission, indicating to the terminal the frequency hopping mode for the Msg3 PUSCH retransmission based on target DCI; wherein the target DCI is DCI scheduling the Msg3 PUSCH retransmission, and a reserved bit in the target DCI indicates the frequency hopping mode for the Msg3 PUSCH retransmission.

5. A terminal, comprising:

a memory for storing computer programs;

a transceiver for transmitting and receiving data under a control of a processor; and a processor for reading the computer programs in the memory, wherein the computer programs, when executed by the processor, causes the terminal to perform the following operation:

determining, based on a predefined rule, a frequency hopping mode for message 3 (Msg3) physical uplink shared channel (PUSCH); wherein the terminal has enabled the Msg3 PUSCH repetition and frequency hopping in frequency domain;

wherein for Msg3 PUSCH initial transmission, the determining, based on the predefined rule, the frequency hopping mode for Msg3 PUSCH comprises any one of the following:

determining the frequency hopping mode based on whether repetition type A for the Msg3 PUSCH repetition is enabled; or determining, based on a preamble index, the frequency hopping mode for the case in which repetition type A for the Msg3 PUSCH repetition is enabled, wherein a correspondence relationship between the preamble index and the frequency hopping mode is given;

wherein the frequency hopping mode comprises intra-slot frequency hopping or inter-slot frequency hopping.

6. The terminal of claim 5, wherein for Msg3 PUSCH retransmission, the determining, based on the predefined rule, the frequency hopping mode for Msg3 PUSCH, comprises:

in case that repetition type A is enabled for the Msg3 PUSCH retransmission, determining a frequency hopping mode for Msg3 PUSCH initial transmission as a frequency hopping mode for the Msg3 PUSCH retransmission; or in case that repetition type A is enabled for the Msg3 PUSCH retransmission, determining the frequency hopping mode for the Msg3 PUSCH retransmission based on target DCI; wherein the target DCI is DCI scheduling the Msg3 PUSCH retransmission, and a reserved bit in the target DCI indicates the frequency hopping mode for the Msg3 PUSCH retransmission.

7. A network side device, comprising:

a memory for storing computer programs;

a transceiver for transmitting and receiving data under a control of a processor; and a processor for reading the computer programs in the memory, wherein the computer programs, when executed by the processor, causes the network side device to perform the following operation:

determining, based on a predefined rule, a frequency hopping mode for message 3 (Msg3) physical uplink shared channel (PUSCH); wherein the terminal has enabled the Msg3 PUSCH repetition and frequency hopping in frequency domain;

wherein for Msg3 PUSCH initial transmission, the determining, based on the predefined rule, the frequency hopping mode for Msg3 PUSCH, comprises any one of the following:

determining the frequency hopping mode based on whether repetition type A for the Msg3 PUSCH repetition is enabled; or determining, based on a preamble index, the frequency hopping mode for the case in which repetition type A for the Msg3 PUSCH repetition is enabled, wherein a correspondence relationship between the preamble index and the frequency hopping mode is given;

wherein the frequency hopping mode comprises intra-slot frequency hopping or inter-slot frequency hopping.

8. The network side device of claim 7, wherein for Msg3 PUSCH retransmission, the determining, based on the predefined rule, the frequency hopping mode for Msg3 PUSCH, comprises:

in case that repetition type A is enabled for the Msg3 PUSCH retransmission, determining a frequency hopping mode for Msg3 PUSCH initial transmission as a frequency hopping mode for the Msg3 PUSCH retransmission; or in case that repetition type A is enabled for the Msg3 PUSCH retransmission, indicating to the terminal the frequency hopping mode for the Msg3 PUSCH retransmission based on target DCI; wherein the target DCI is DCI scheduling the Msg3 PUSCH retransmission, and a reserved bit in the target DCI indicates the frequency hopping mode for the Msg3 PUSCH retransmission.

9. The method of claim 1, wherein the determining the frequency hopping mode based on whether repetition type A for the Msg3 PUSCH repetition is enabled comprises:

in case that the Msg3 PUSCH is transmitted over a single slot, determining the frequency hopping mode as intra-slot frequency hopping; or in case that the Msg3 PUSCH is transmitted over multiple slots, determining the frequency hopping mode as inter-slot frequency hopping.

10. The method of claim 3, wherein the determining the frequency hopping mode based on whether repetition type A for the Msg3 PUSCH repetition is enabled comprises:

in case that the Msg3 PUSCH is transmitted over a single slot, determining the frequency hopping mode as intra-slot frequency hopping; or in case that the Msg3 PUSCH is transmitted over multiple slots, determining the frequency hopping mode as inter-slot frequency hopping.

11. The method of claim 5, wherein the determining the frequency hopping mode based on whether repetition type A for the Msg3 PUSCH repetition is enabled comprises:

in case that the Msg3 PUSCH is transmitted over a single slot, determining the frequency hopping mode as intra-slot frequency hopping; or in case that the Msg3 PUSCH is transmitted over multiple slots, determining the frequency hopping mode as inter-slot frequency hopping.

12. The method of claim 7, wherein the determining the frequency hopping mode based on whether repetition type A for the Msg3 PUSCH repetition is enabled comprises:

in case that the Msg3 PUSCH is transmitted over a single slot, determining the frequency hopping mode as intra-slot frequency hopping; or in case that the Msg3 PUSCH is transmitted over multiple slots, determining the frequency hopping mode as inter-slot frequency hopping.

* * * * *